(12) United States Patent
Simmons (10) Patent No.: US 8,453,414 B2
(45) Date of Patent: Jun. 4, 2013

(54) QUICK-SET, FULL-MOMENT-LOCK, COLUMN AND BEAM BUILDING FRAME SYSTEM AND METHOD

(75) Inventor: Robert J. Simmons, Hayward, CA (US)

(73) Assignee: ConXtech, Inc., Hayward, CA (US)

(*) Notice: Subject to any disclaimer, the term of this patent is extended or adjusted under 35 U.S.C. 154(b) by 796 days.

(21) Appl. No.: 10/987,489

(22) Filed: Nov. 12, 2004

(65) Prior Publication Data

US 2005/0066612 A1 Mar. 31, 2005

Related U.S. Application Data

(63) Continuation-in-part of application No. 09/943,711, filed on Aug. 30, 2001, now Pat. No. 6,837,016, and a continuation-in-part of application No. 10/884,314, filed on Jul. 2, 2004, now Pat. No. 7,021,020, which is a continuation of application No. 09/943,711, filed on Aug. 30, 2001, now Pat. No. 6,837,016.

(51) Int. Cl.
*E04B 1/00* (2006.01)
*E04G 21/00* (2006.01)
*E04G 23/00* (2006.01)

(52) U.S. Cl.
USPC ..... 52/745.17; 52/656.9; 52/655.1; 52/653.1; 52/654.1; 403/169; 403/231; 403/187; 403/388

(58) Field of Classification Search
USPC ............ 52/741.15, 745.12, 721.5, 648.1, 52/653.1, 657, 656.9, 236.3, 167.3, 655.1, 52/654.1, 741.1, 745.17; 403/169, 170, 230, 403/231, 187, 388, 188, 393
See application file for complete search history.

(56) References Cited

U.S. PATENT DOCUMENTS

| | | | |
|---|---|---|---|
| 925,677 A | | 6/1909 | Belcher |
| 1,400,066 A | * | 12/1921 | Huck .............. 446/123 |

(Continued)

FOREIGN PATENT DOCUMENTS

| | | |
|---|---|---|
| FR | 7930259 | 12/1979 |
| FR | 8704682 | 4/1987 |

(Continued)

OTHER PUBLICATIONS

"Moment Connections"—Document available on the internet at: http://people.fsv.cvut.cz/~wald/CESTRUCO/Texts_of_lessons/ 06-GB_Moment_Connections.pdf Chapter 6, 16pp.

*Primary Examiner* — Joshua J Michener
*Assistant Examiner* — Chi Q Nguyen
(74) *Attorney, Agent, or Firm* — Jon M. Dickinson, Esq.; Robert D. Varitz, Esq.

(57) ABSTRACT

A method, and associated apparatus, for assembling a structural frame from elongate, tubular columns having plural sides, and a selected style of elongate beams, with respect to which, the method includes the steps of (a) pre-fitting the sides of such columns and the ends of such beams with attached, gravity-set, complementary interconnect structures (either collar-form or non-collar form in nature), including column-side-fitted interconnect structures and beam-end-fitted interconnect structures, (b) utilizing gravity, bringing interconnect-structure pre-fitted beams and columns into correct, predetermined, relative design dispositions relative to one another, and (c) through the performing of the bringing step alone, and on the resulting occurrence of the achievement of the mentioned correct, predetermined, relative design dispositions between a beam and a column, simultaneously and immediately thereby establishing (1) a full-moment load-bearing connection, and (2) a relatively positionally gravity-set-and-stabilized condition, between that beam and column.

1 Claim, 8 Drawing Sheets

U.S. PATENT DOCUMENTS

| | | | |
|---|---|---|---|
| 1,729,743 A | | 5/1927 | Jorgensen et al. |
| 2,008,087 A | * | 7/1935 | Stromberg .................... 403/189 |
| 3,148,477 A | | 9/1964 | Bjørn et al. |
| 3,396,499 A | | 8/1968 | Biffani |
| 3,410,044 A | | 11/1968 | Moog |
| 3,562,988 A | | 2/1971 | Gregoire |
| 3,664,011 A | | 5/1972 | Labastrou |
| 3,685,866 A | | 8/1972 | Patenaude |
| 3,706,169 A | | 12/1972 | Rensch |
| 3,829,999 A | | 8/1974 | Bernstein |
| 3,977,801 A | | 8/1976 | Murphy |
| 4,019,298 A | | 4/1977 | Johnson, IV |
| 4,577,449 A | | 3/1986 | Celli |
| 4,684,285 A | | 8/1987 | Cable |
| 4,742,665 A | | 5/1988 | Baierl |
| 4,905,436 A | * | 3/1990 | Matsuo et al. .................. 52/252 |
| 5,061,111 A | * | 10/1991 | Hosokawa ................ 403/232.1 |
| 5,240,089 A | * | 8/1993 | Spera ........................ 182/186.7 |
| 5,244,300 A | | 9/1993 | Perriera et al. |
| 5,289,665 A | | 3/1994 | Higgins |
| 5,342,138 A | * | 8/1994 | Saito et al. .................... 403/189 |
| 5,590,974 A | * | 1/1997 | Yang ............................. 403/327 |
| 5,605,410 A | | 2/1997 | Pantev |
| 5,678,375 A | | 10/1997 | Juola |
| 6,082,070 A | | 7/2000 | Jen |
| 6,092,347 A | | 7/2000 | Hou |
| 6,106,186 A | * | 8/2000 | Taipale et al. ............. 403/322.4 |
| 6,219,989 B1 | * | 4/2001 | Tumura .......................... 52/838 |
| 6,390,719 B1 | | 5/2002 | Chan |
| 6,802,169 B2 | * | 10/2004 | Simmons ..................... 52/648.1 |
| 6,837,016 B2 | * | 1/2005 | Simmons et al. ............ 52/655.1 |
| 7,021,020 B2 | * | 4/2006 | Simmons et al. ............ 52/656.9 |

FOREIGN PATENT DOCUMENTS

| | | |
|---|---|---|
| GB | 1204327 | 9/1970 |
| JP | 2011-22001 | 1/1999 |
| JP | 2000-110236 | 4/2000 |
| WO | WO 98/36134 | 8/1998 |

\* cited by examiner

QUICK-SET, FULL-MOMENT-LOCK, COLUMN AND BEAM BUILDING FRAME SYSTEM AND METHOD

CROSS REFERENCES TO RELATED APPLICATIONS

This application is a continuation-in-part of U.S. patent application Ser. No. 09/943,711, filed Aug. 30, 2001 now U.S. Pat. No. 6,837,016, by Simmons et al., for "Moment-Resistant Building Frame Structure Componentry and Method", and a continuation-in-part of U.S. patent application Ser. No. 10/884,314, filed Jul. 2, 2004 now U.S. Pat. No. 7,021,020, by Simmons et al., for "Moment-Resistant Building Frame Structure Componentry and Method" which second-mentioned patent application is, in turn, a continuation of U.S. patent application Ser. No. 09/943,711, filed Aug. 30, 2001 now U.S. Pat. No. 6,837,016, by Simmons et al., for "Moment-Resistant Building Frame Structure Componentry and Method". All contents of these prior-filed and currently co-pending patent applications are hereby incorporated herein by reference

BACKGROUND AND SUMMARY OF THE INVENTION

This invention (structure and method) relates to column and beam frame structure, and in particular to a novel structural interconnect organization (and related methodology) involving the quick setting, into full-moment-capability, of correctly design-positioned columns and beams. A preferred form of the invention, both structurally and methodologically, is described herein principally with reference to a unique, bearing-face collar-interconnect structure which joins adjacent columns and beams at nodes of intersection between them in a manner whereby, when a column and a beam are brought, through gravity lowering of a beam into place, into correct, design-intended, relative positions, they become instantly gravity-set substantially against further relative motion, and instantly stabilized in correct, full-moment and positional relationship with respect to one another.

To this end, the invention proposes a column-beam quick-set interconnect structural system and methodology wherein the ends of beams are joined to columns at nodes of intersection, preferably through unique collar structures that effectively circumsurround the sides and the long axes of columns, to deliver, through confronting bearing faces, compressive loads which are derived from moment loads experienced by the beams. These collar structures are configured in such a manner that, as the end of a prepared beam approaches its correct, design-intended position relative to a column, the collar structures both (a) guide these two components toward that correct relative disposition, and (b) instantly gravity-set and stabilize these components exactly as they arrive at that position. Not only does this very special action occur in accordance with the invention, so also occurs the then instant gravity-set-and-stabilized establishment of a full-moment interconnection between the subject column and beam. I refer to this significant characteristic of the present invention as a "drop-and-set" style of immediate, full-moment, properly-positioned connection.

For the purpose of illustration herein, the invention is described in the setting of a structural building frame, but it should be understood that various other kinds of structural frames may well also utilize the invention.

As will be seen, the invention is intended for use in conjunction with upright tubular columns each of a character having plural sides preferably distributed equiangularly around, and in common spaced relations relative to, the associated column's long axis. The interconnect structure of the invention uniquely is designed for fully compatible use between a beam and a column on any and every side of such a column. No matter which column side is involved, essentially exactly the same-character, full-moment, column-beam, properly-relatively-positioned interconnection develops. In other words, the invention is designed so that every full-moment connection created by it on each and every side of a column is always functionally the same. This feature of the invention can be visualized, therefore, as offering a kind of "omni-directional" functional symmetry relative to the long axis of a column. This symmetry concept will be more fully explained herein as the description of a preferred form of the invention unfolds below.

One other point should be mentioned here before advancing to a fuller discussion of the preferred collar-form of column-beam interconnection. It is this. Immediate same-invention predecessor structures of mine did not necessarily invoke the collar-form connection approach. They did, however, embody the drop-and-set principle of interconnection mentioned above, as well as the principle just referred to above as omni-directional functional symmetry. Drawing FIGS. 11-13, inclusive, herein illustrate interconnect components in three different ones of these predecessor versions of the invention.

Returning now to the discussion involving the preferred collar-form interconnection, the delivery through compression of moment loads carried from beams to columns involves the development in the columns of vertically offset reverse-direction compression loads which create related moments in the columns. With respect to each and every lateral load that is experienced by a building frame constructed in accordance with the invention, all lateral loads are essentially equally shared by all of the columns, and a consequence of this is that, in comparison to building frame structures built conventionally, a building frame structure constructed in accordance with this invention prevents any single column from carrying any more load than is carried by any other column. As will become apparent, this important feature of the invention, as it performs, enables a building to be constructed in such a way as to exceed minimum building code requirements in many instances, and thus open the opportunity for using a building frame in accordance with this invention in settings where conventional frame structure would not meet code requirements.

The nodal connections which result from practice of the preferred form of the present invention function to create what is referred to as three-dimensional, multi-axial, moment-coupling, load transfer interconnections and interactions between beams and columns.

Focusing on the specific load-delivery interaction which occurs between a given single column and a connected single beam that bears a moment load, this load is coupled compressively into the column by the associated, single, nodal collar structure at plural bearing-face regions which are angularly spaced about the column's long axis. Compressive load-transfer coupling is not constrained to just one plane of action, or to just one localized region of load delivery. Compression couplets are created to take fuller advantage of columns' load-handling capabilities.

The illustrative and preferably proposed nodal collar structures include inner components which are anchored, as by welding, to the outside surfaces of columns, and an outer collar which is made up of components that are suitably anchored, also as by welding, to the opposite ends of beams.

The inner and outer collar components are preferably and desirably formed by precision casting and/or machining, and are also preferably pre-joined to columns and beams in an automated, factory-type setting, rather than out on the construction job site. Accordingly, the invented collar components lend themselves to economical, high-precision manufacture and assembly with columns and beams, which can then be delivered to a job site ready for accurate assembly.

As will become apparent from an understanding of the respective geometries proposed by the present invention for the collar components, these components play a significant role during early building-frame assembly, as well as later in the ultimate performance of a building.

At the regions of connection between beams and columns, and with respect to pairs of adjacent columns standing upright approximately correctly (vertically) in space on a job site, as beams are lowered into horizontal positions, the outer collar components that they carry at their opposite ends seat under the influence of gravity through special, angular, bearing-face geometry provided in them and in the confronting inner column components. This bearing-face geometry effectively guides and collects a lowered beam, and the associated two columns, into stabilized, gravity-locked conditions, with these now-associated beam and column elements then essentially correctly aligned and positioned in space relative to one another. Male/female cleat/socket configurations formed in and adjacent the confronting bearing-face portions of the inner and outer collar components function under the influence of gravity, during such preliminary building construction, not only to enable such gravity locking and positioning of the associated frame components, but also to establish immediate, full-moment stability, even without further assembly taking place at the nodal locations of column-beam intersections.

Following preliminary frame assembly, appropriate tension bolts are preferably introduced into the collar structures, and specifically into the components of the outer collar structures, effectively to lock the inner and outer collar structures in place against separation, and to introduce available tension load-bearing constituents into the outer collar structures. Such tension load bearing plays an important role in the way that the structure of the present invention gathers and couples beam moment loads multidirectionally into columns.

Confronting faces between the inner and outer collar components function as bearing faces to deliver, or transfer, moment loads (carried in beams) directly as compression loads into the columns. In particular, these bearing faces deliver such compression loads to the columns at plural locations which are angularly displaced about the long axes of the columns (because of the axial encircling natures of the collars). Such load distribution takes substantially full advantage of the load-carrying capabilities of the columns with respect to reacting to beam moment loads.

Accordingly, a building frame structure assembled in accordance with this invention results in a quickly assembleable, and remarkably stable and capable frame, wherein all lateral loads transfer via compression multiaxially, and at distributed nodes, into the columns, and are born in a substantially relatively evenly and uniformly distributed fashion throughout the entire frame structure. Such a frame structure requires no bracing or shear walls, and readily accommodates the later incorporation (into an emerging building) of both outer surface skin structure, and internal floor structure.

The nodal interconnections which exist between beams and columns according to this invention at least from one set of points of view, can be visualized as discontinuous floating connections—discontinuous in the sense that there is no uninterrupted (homogenous) metal or other material path which flows structurally from beams to columns and floating in the sense that beams and columns could, if so desired, be nondestructively disconnected for any particular purpose. Thinking about the latter consideration from yet another point of view, the connective interface that exists between a beam and a column according to this invention includes a portion which experiences no deformation during load handling, such portion being resident at the discontinuity which exists between beams and columns at the nodal interfaces.

These, and various other, features and advantages which are offered by this invention will become more fully apparent as the description that now follows is read in conjunction with the accompanying drawings.

DESCRIPTION OF THE DRAWINGS

FIGS. 11-13, inclusive, and in modest detail only, show interconnect components in three earlier versions of the invention.

DETAILED DESCRIPTION OF AND MANNER OF PRACTICING THE INVENTION

Figure 1:
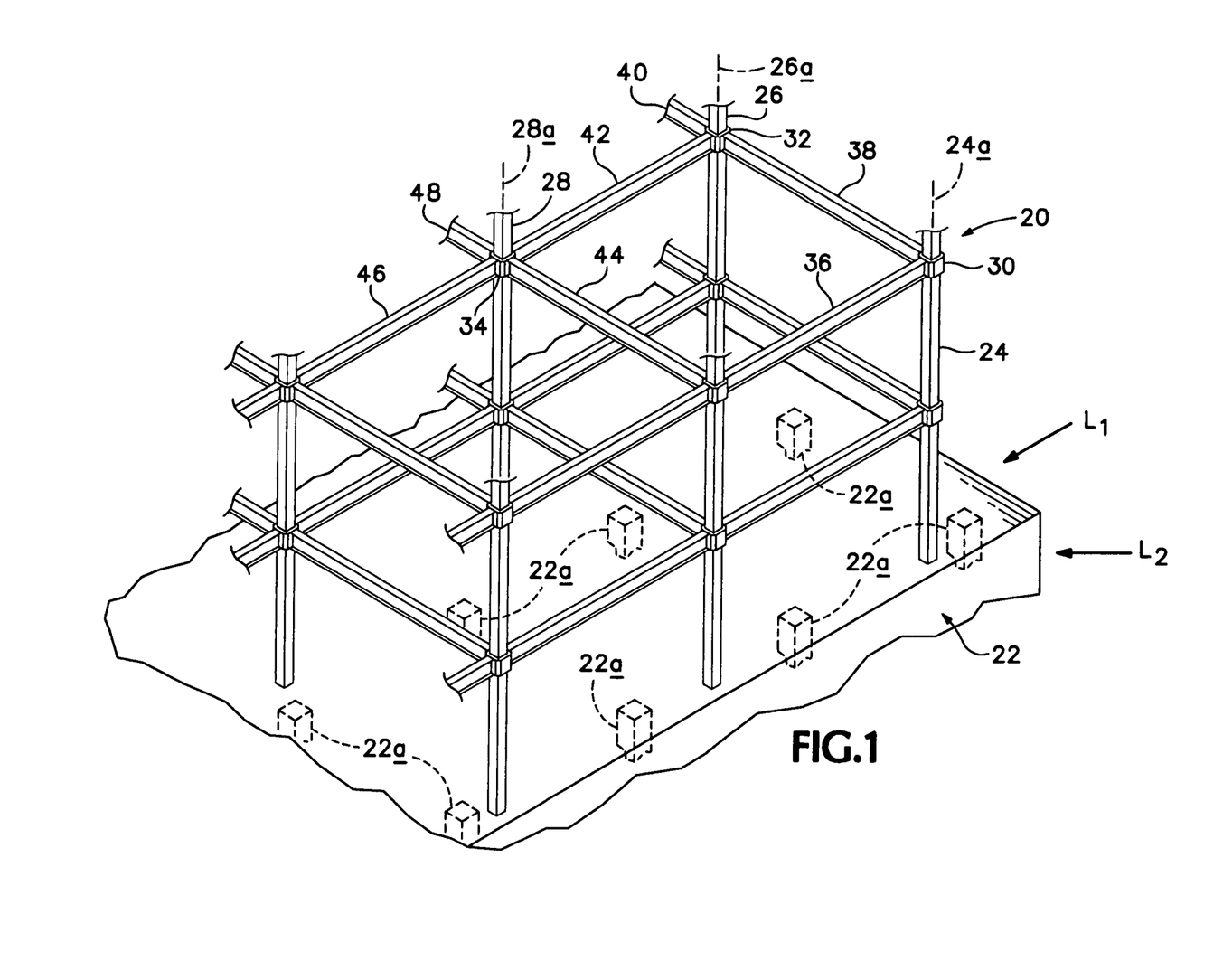
FIG. 1 is a fragmentary, isometric view illustrating a building frame structure which has been constructed in accordance with the present invention, shown in a stage of assembly supported on top of an underlying, pre-constructed, lower building structure, referred to herein as a podium structure.
Figure 2:
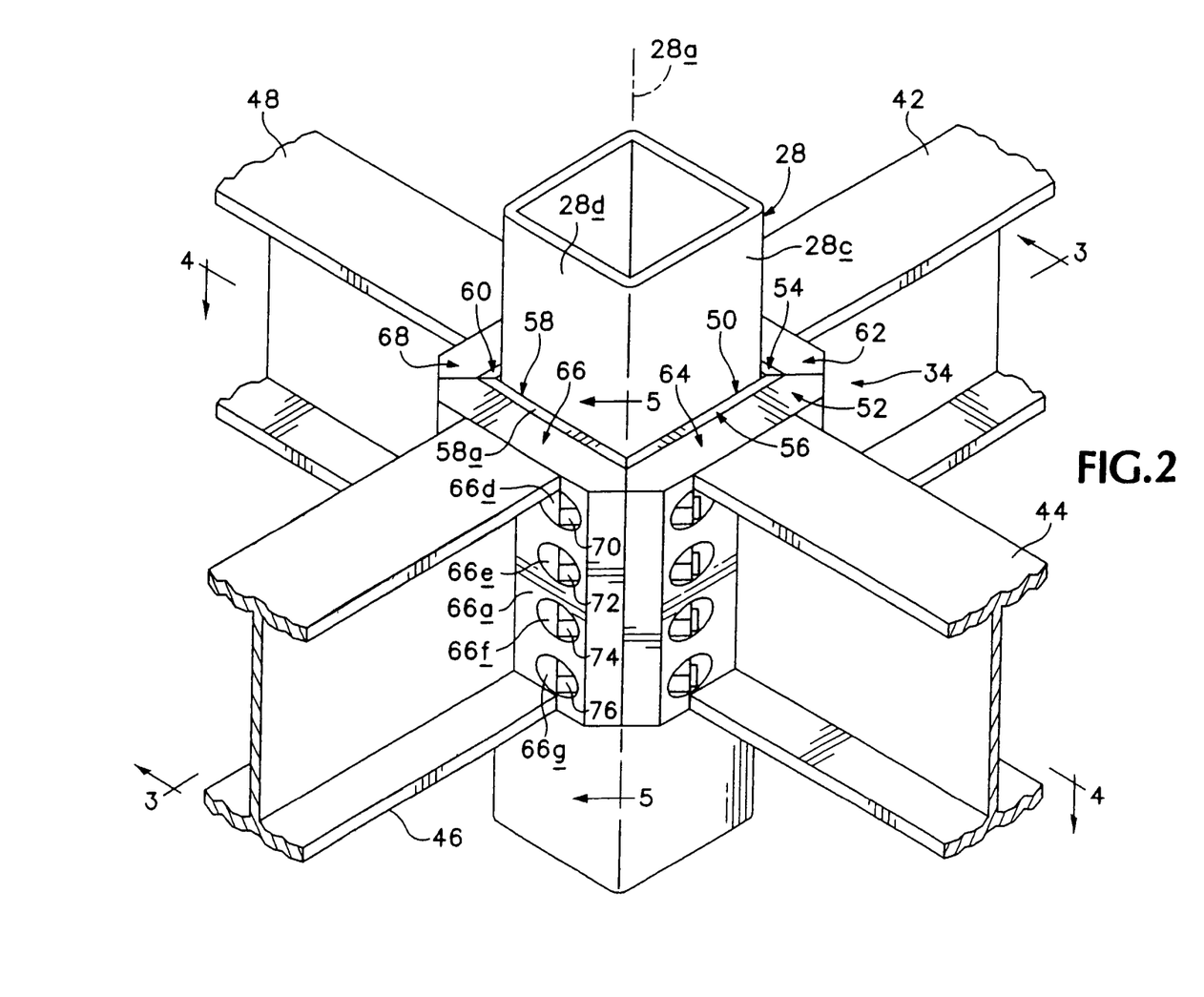
FIG. 2 is a fragmentary, isolated, isometric view illustrating collar structure employed at one nodal location in the building frame structure of FIG. 1 in accordance with the present invention.

Turning attention now to the drawings, and referring first of all to FIG. 1, pictured generally at 20 is a building frame structure which has been constructed in accordance with the present invention. This structure is also referred to herein as building structure, and as a structural system. As will be appreciated by those skilled in the art, frame structure 20 might be constructed on, and rise from, any suitable, underlying support structure, such as the ground, but in the particular setting illustrated in FIG. 1, structure 20 is shown supported on, and rising from, the top of a pre-constructed, underlying "podium" building structure 22, such as a parking garage. One reason for illustrating structure 20 herein in the context of being on top of podium structure 22 is to point out an important feature offered by the present invention, and which will be discussed more fully shortly. One should note at this point, in relation to what is shown in FIG. 1, that podium structure 22 includes, among other structural elements, a distributed row-and-column array of columns, such as those shown at 22a. In the context of describing shortly the just-suggested feature and advantage of the structure of the present invention, reference will be made to the fact that the horizontally distributed row-and-column positions of columns 22a is different from that of the columns, now to be more fully discussed, which are present in frame structure 20.

Accordingly, included in frame structure 20, and arranged therein in what has been referred to as a row-and-column array, are plural, upright, elongate columns, such as those shown at 24, 26, 28. The long axes of columns 24, 26, 28, are shown at 24a, 26a, 28a, respectively. As can be seen in several of the drawing figures, these columns possess plural sides (four herein) distributed equiangularly around, and in common (or alike) spaced relations relative to, the respective column long axes. At one elevation in frame structure 20, connected to columns 24, 26, 28, through collar structures, or collars (also referred to as collar-form interconnect structures), 30, 32, 34, respectively, are elongate horizontal beams 36, 38, 40, 42, 44, 46, 48. Collars 30, 32, 34, as is true for (and with respect to) all of the other collars employed in frame structure 20, are substantially alike in construction. Collar 30 accommodates the attachment to column 24 of beams 36, 38. Collar 32 accommodates the attachment to column 26 of beams 38, 40, 42. Collar 34 accommodates the attachment to column 28 of beams 42, 44, 46, 48.

It should thus be understood that the particular embodiment of the invention now being described offers a system for connecting, at a single node of connection with a column, up to a total of four beams. All connections are functionally the same, and as can be seen, can be established on all sides of a column, with each such connection having the same positional and functional relationship with respect to the column's long axis. As a consequence, all moment loads delivered from such beams to a commonly connected column have the same "load-handling access" to the moment-carrying capacity of that column—i.e., the column has no "favorite, or differentiated, side, or sides". This is one way of further expressing the above-mentioned "omni-directional functional symmetry". As the description of this invention progresses herein, those skilled in the art will recognize that modifications of the invention can be introduced and employed easily enough to accommodate an even greater number of connections, at a particular "node of connection", if a particular column has a greater number of appropriate sides to accommodate this.

The specific embodiment and methodology of the invention presented herein, is (are) shown and described with respect to a building frame structure wherein the columns are hollow, or tubular, in nature, are formed of steel, and possess a generally square cross-section, with four orthogonally associated, outwardly facing sides, or faces. Also, the invention is described herein in connection with employing conventional I-beam-configuration beams.

Continuing now with FIG. 1, one should note therein that the row-and-column array of columns in frame structure 20 is such that the long axes of the associated columns are not aligned on a one-to-one basis with the long axes of previously mentioned columns 22a in podium structure 22. It should further be noted that the bases of the columns in structure 20 may be anchored in place near the top of the podium structure in any suitable manner, the details of which are neither specifically illustrated nor discussed herein, inasmuch as these anchor connections form no part of the present invention.

Directing attention now to FIGS. 1-6, inclusive, the interconnection, or interface, region between a column and a beam according to the present invention is specifically discussed with respect to the region where column 28 connects with the adjacent ends of beams 42, 44, 46, 48. This region of connection, a nodal region (or node), is one which employs previously mentioned collar 34. The description which now follows for collar 34 per se should be understood to be essentially a detailed description of all of the other collars employed in frame structure 20. With respect to this description, four orthogonally associated, outwardly facing, planar faces 28b, 28c, 28d, 28e in column 28 are involved.

Collar 34 includes an inner collar structure (or column-attachable member) 50, and an outer collar structure 52. These inner and outer collar structures are also referred to herein as gravity-utilizing, bearing-face structures, or sub-structures. The inner collar structure is made up of four components shown at 54, 56, 58, 60. The outer collar structure is made up of four components (or beam-end attachable members) 62, 64, 66, 68. Each of these components in the inner and outer collar structures is preferably made off the job site by precision casting and/or machining, with each such component preferably being pre-assembled appropriately with a column or a beam, also at a off-site location. Inner collar components 54, 56, 58, 60 are suitably welded to faces 28b, 28c, 28d, 28e, respectively, in column 28. Outer collar components 62, 64, 66, 68 are suitably welded to those ends of beams 42, 44, 46, 48, respectively, which are near column 28 as such is pictured in FIGS. 2-6, inclusive. Such precision manufacture, and pre-assembly with columns and beams, results in what will be recognized to be a very high-precision interconnect system between beams and columns in frame 20. This interconnect system plays a significant role in all aspects of the drop-and-set behavior discussed earlier, and which lies at the heart of the present invention.

Each of the four components just mentioned above (54, 56, 58, 60) which make up inner collar structure 50 is essentially identical to the other such components, and accordingly, only component 58 is now described in detail. Component 58 includes a somewhat planar, plate-like body 56a, with an inner, planar face 58b which lies flush with column face 28d. Body 56a also includes a planar, outer face 58c which lies in a plane that slopes downwardly and slightly outwardly away from the long axis 28a of column 28 (see particularly FIGS. 3 and 5). Face 58c is referred to herein as a bearing face.

Figure 3:
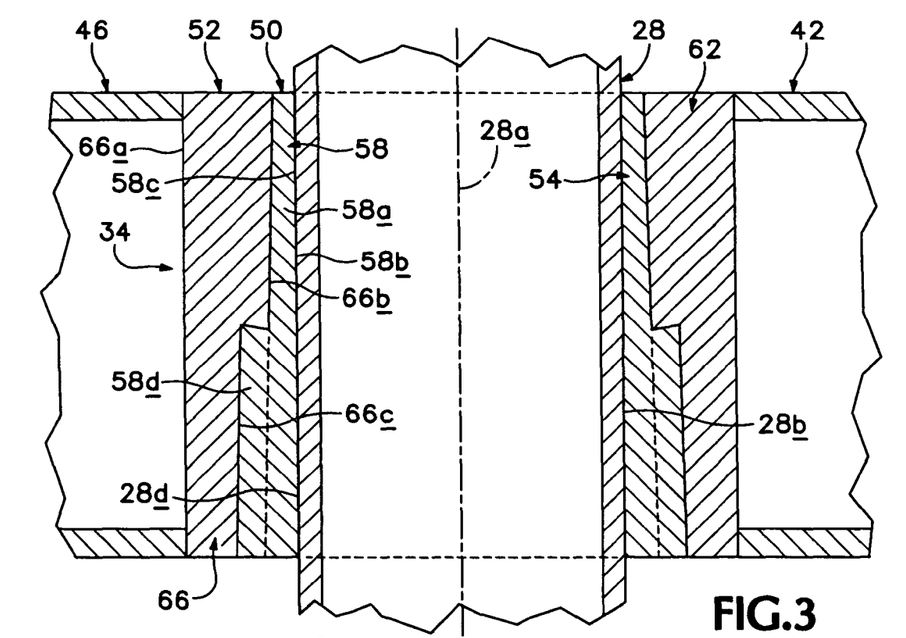
FIGS. 3, 4 and 5 are fragmentary, cross-sectional views taken generally along the lines 3-3, 4-4 and 5-5, respectively, in FIG. 2.
Figure 4:
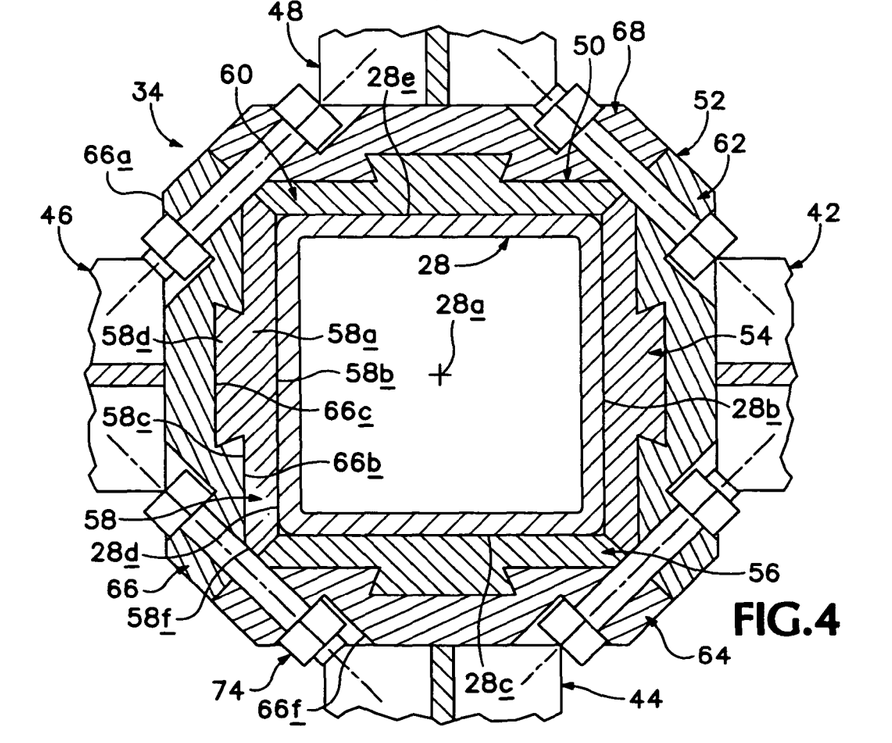
Figures 5, 6:
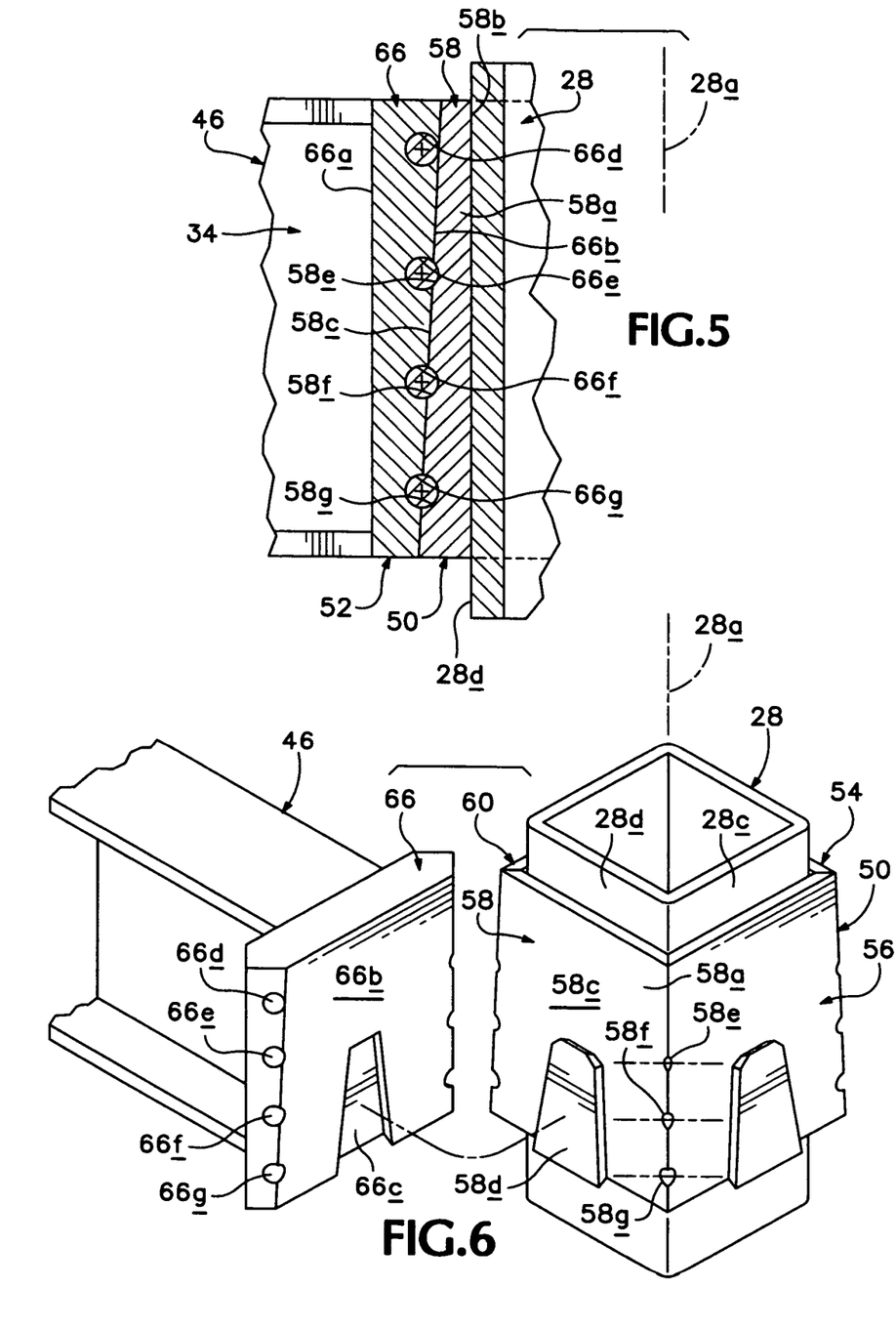
FIG. 6 is a fragmentary, angularly exploded, isometric view illustrating the structures of, and the operational relationship between, a pair of inner and outer collar components constructed and functioning in accordance with the present invention.

Projecting as an island outwardly from face 58c as illustrated is an upwardly tapered, wedge-shaped cleat 58d which extends, with generally uniform thickness, from slightly above the vertical midline of component 58 substantially to the bottom thereof. The laterally and upwardly facing edges of cleat 58d are underbeveled for a reason which will become apparent shortly. This underbeveling is best seen in FIGS. 3, 4 and 6. Cleat 58d is referred to herein also as cleat structure, and as gravity-effective, first-gender structure.

In building structure 20, inner collar component 58 connects, in a complementary manner which will now be described, with outer collar component 66 in outer collar structure 52. The somewhat planar body of component 66 has an outer face 66a which is welded to beam 46, and which is vertical in disposition in structure 20. Component 66 also has a broad, inner face 66*b* which lies in a plane that substantially parallels the plane of previously mentioned component face 58*c* in inner collar component 58. Face 66*b* is also referred to herein as a bearing face.

Appropriately formed within the body of component 66, and extending into this body from face 66*b*, is an angular, wedge-shaped socket 66*c* which is sized to receive, snuggly and complementarily, previously mentioned cleat 58*d*. Cleat 58*d* and socket 66*c* are referred to herein collectively as gravity-mating cleat and socket structure. The three lateral walls of socket 66*c* are appropriately angled to engage (fittingly) three of the underbeveled edges in cleat 58*d*. Socket 66*c* is also referred to herein as gravity-effective, second-gender structure.

Looking now at both of components 58, 66, and completing descriptions of their respective constructions, formed at the two lateral sides of component 66 are four, counter-sunk, bolt-receiving bore holes, such as those shown at 66*d*, 66*e*, 66*f*, 66*g*. Formed in the lateral edges of component body 58*a* are three related notches, such as those shown at 58*e*, 58*f*, 58*g*. Notches 58*e*, 58*f*, 58*g* align with bore holes 66*e*, 66*f*, 66*g*, respectively, when components 58, 66 are properly seated relative to one another as pictured in FIGS. 1-5, inclusive. Appropriate dash-dot lines and cross marks in FIGS. 4, 5 and 6 illustrate the central axes of these (and other non-numbered) boreholes, and how these axes (certain ones of them) align with the mentioned and illustrated notches. The notches herein are also referred to as bolt clearance passages.

Returning now to a "larger" point of view regarding the nodal connection established at collar 34, one can see that the four beams which here connect with column 28 do so through the components of the collar's inner and outer collar structures, both of which make up the entirety of collar 34. In particular, one should note that collar 34 essentially circumsurrounds or encircles the outside of column 28, as such is viewed along its long axis 28*a*. Outer collar structure 52 seats floatingly and discontinuously (as previously discussed) on inner collar structure 50.

Completing a description of what is shown in FIGS. 1-6, inclusive, sets of appropriate tension bolts and nuts are employed to lock together the components that make up the outer collar structures. With reference to the connections established through collar 34, four sets of four nut and bolt assemblies join the sides of outer collar structure components 62, 64, 66, 68, extending at angles as shown across the corners of the resulting outer collar structure. Four such assemblies are shown generally at 70, 72, 74, 76 in FIG. 2. Assembly 74, as seen in FIG. 4, includes a bolt 74*a* with an elongate shank 74*b* that extends, inter alia, in the bolt-clearance passage created by notch 58*f* and by the counterpart notch present in adjacent component 56.

These nut and bolt assemblies effectively lock the outer collar structure around the inner collar structure, and impede vertical movement of the outer collar structure relative to the inner collar structure. The bolt and nut assemblies also perform as tension-transmitting elements between adjacent outer collar components with respect to moment loads that are carried in the beams which connect through collar structure 34 to column 28. The bolt and nut assemblies assure a performance whereby each moment load in each beam is delivered by collar 34 in a circumsurrounding fashion to column 28.

Figure 7:
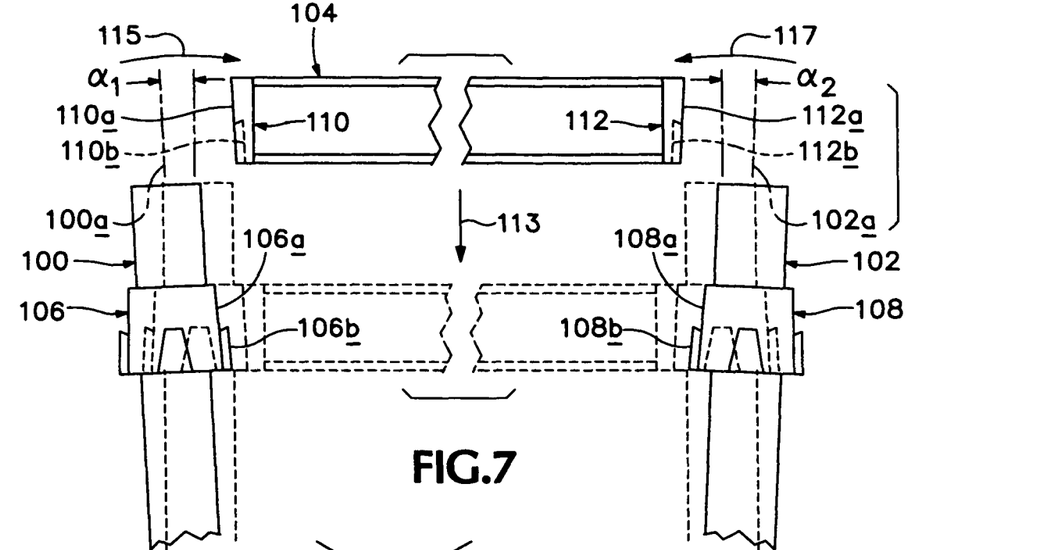
FIGS. 7 and 8 are two different views stylized to illustrate a feature of the present invention involving how gravity lowering of a horizontal beam into place between pairs of adjacent columns functions to create, immediately, a full-moment-resistant, properly spatially organized, overall building frame structure.
Figure 8:
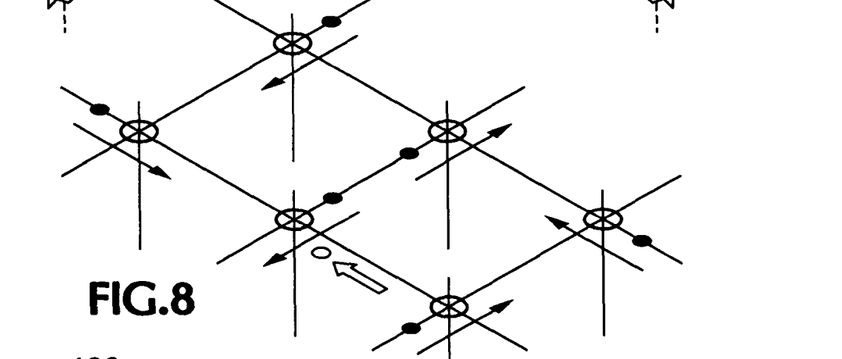
Figures 9, 10:
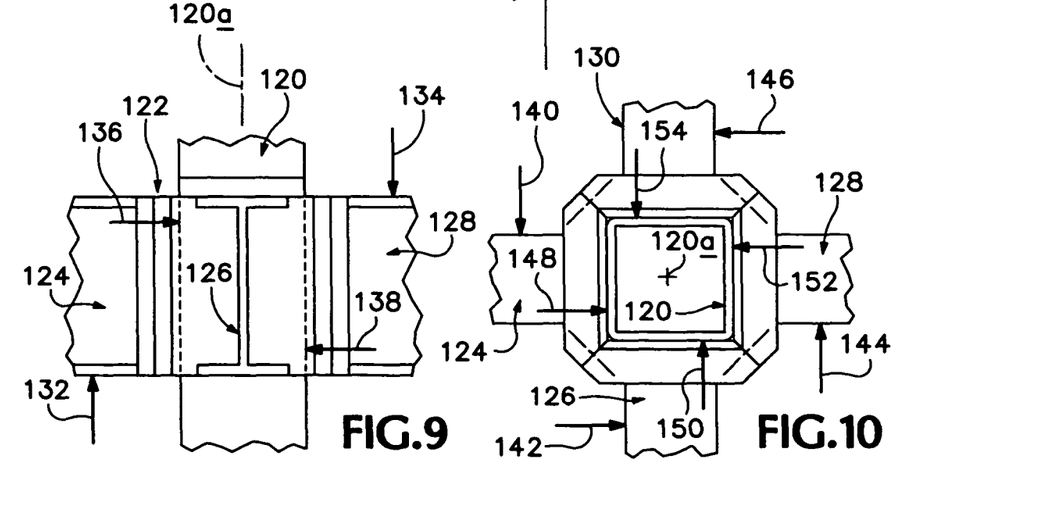
FIGS. 9 and 10 are employed herein to illustrate generally how collar components built in accordance with the present invention function to handle and distribute beam moment loads into columns.

Switching attention now to FIGS. 7-10, inclusive, these four drawing figures (herein new and different reference numerals are employed) help to illustrate certain assembly and operational features and advantages that are offered by the present invention. FIGS. 7 and 8 are key illustrations regarding the present invention, showing stabilizing, positioning, and aligning activities (drop-and-set activities) that take place during early building-frame assembly during lowering of beams into place for connection through the collars to the columns. FIGS. 9 and 10 illustrate generally how the apparatus of the present invention functions uniquely to handle moment loads that become developed in the beams, and specifically how these loads are handled by delivery through bearing face compression to and around the long axis of a column. As will become apparent, some of the moment-handling performance which is pictured in FIGS. 9 and 10 also takes place during the events pictured in FIGS. 7 and 8.

Beginning with a discussion of what is shown in FIG. 7, here there are illustrated, fragmentarily and in solid lines (moved positions), two upright columns 100, 102, and a not-yet-in-place, generally horizontal beam 104. Column 100 is appropriately equipped (prepared), at a desired elevation, with an inner collar structure 106, and column 102 with a similar inner collar structure 108. For the purpose of explanation herein regarding what is shown in FIG. 7, two particular portions only of inner collar structures 106, 108 are relevant. These include, in collar 106, an inclined bearing face 106*a* and an associated cleat 106*b*, and in collar 108, an inclined bearing face 108*a* and a projecting cleat 108*b*.

Welded, as previously described, to the opposite ends of beam 104 (i.e., beam ends prepared) are two outer collar structure components 110, 112. As was true with regard to the just-mentioned inner collar structure components which are welded to columns 100, 102, with regard to components 110, 112, there are principally two most relevant structural features that should be identified and addressed specifically. These include an inclined bearing face 110*a* and a socket 110*b* in component 110, and an inclined bearing face 112*a* and a socket 112*b* in component 112.

In solid lines, columns 100, 102 are shown inclined away from one another as pictured in the plane of FIG. 7, and specifically with their respective long axes, 100*a*, 102*a* occupying outwardly displaced angles $\alpha_1$ and $\alpha_2$, respectively, relative to the vertical. Reference to these angular displacements being outward is made in relation to the vertical centerline of FIG. 7. It should also be noted that the angular vertical misalignment pictured in columns 100, 102 has been exaggerated for the purpose of exposition and illustration herein.

Generally speaking, while there may often (or always) be some lack of true verticality in columns that have not yet been connected in accordance with the invention, the out-of-verticality condition (as a practical reality) will typically be modest enough so, that upon lowering of a beam into position for attachment, such as lowering of beam 110 for attachment (through collar components 106, 108, 110, 112) to columns 100, 102, the confronting bearing faces and cleat and socket structure present in the opposite ends of the beam will be close enough to one another to cause the components to engage and register without special effort required to cause this to happen.

Upon lowering of beam 104 as indicated by arrow 113, and assuming that the angular misalignment condition which is exaggerated in FIG. 7 is not quite so great, components 106, 110 begin to contact one another, as do also components 108, 112. Very specifically, with progressive lowering of the beam, the respective confronting (and now engaging) cleats and sockets begin to nest complementarily. The underbeveled edges of the lateral sides of the cleats, in cooperation with the matching complementary lateral surfaces in the gathering sockets, to draw the two columns toward one another. In particular, the two columns are shifted angularly toward one another (see arrows 115, 117) into conditions of correct relative spacing, alignment and relative angular positioning, with beam 110 ending up in a true horizontal disposition correctly aligned and positioned angularly and translationally with respect to columns 100, 102. Such a true horizontal condition for beam 104 depends, of course, upon the columns having the correct relative vertical dispositions. Lowering of the beam, and urging of the columns into the positions just mentioned, effectively comes to a drop-and-set conclusion, (a) with gravity causing the beam to "set" into a positionally stabilized, immediate full-moment condition with respect to the two columns, (b) with the cleats and receiving sockets fully and intimately engaged, and (c) with the major bearing surfaces, 106a, 10a and 108a, 112a, confronting and in contact with one another.

It should thus be apparent that the act of lowering the beam into place, causes gravity effectively to create an instantly full-moment stabilized and correctly positionally fixed relationship between a pair of columns and a beam. It should especially be noted that, until a prepared beam end and a prepared column side are spatially adjusted to possess precisely the design-correct final relative dispositions, the associated beam and column are neither yet (a) in design-correct relative spatial dispositions (translationally or angularly), nor (b) in a full-moment interconnect condition. However, the instant that a design-correct relative disposition does exist for that prepared beam end and prepared column side, the associated beam and column are then immediately (a) gravity-seated and fixed in design-correct relative dispositions, and (b) engaged in full-moment load-bearing condition relative to one another.

It should be apparent that, while FIG. 7 has been employed to illustrate a specific condition in a single plane where two columns are effectively splayed outwardly away from one another, the columns might be in a host of different relative angular dispositions in relation to the vertical. For example, they could both effectively be leaning in the same direction as pictured in FIG. 7, or they could be leaning toward one another. Further, they could be leaning in either or all of those different kinds of conditions, and also leaning into and/or out of the plane of FIG. 7.

FIG. 8 pictures schematically this more general, probable scene of column non-verticality. It does so in a somewhat three-dimensional manner. Here, single elongate lines are pictured to illustrate obvious representations of an array of columns (vertical lines) and a layer of beams (angled lines) interconnected to the columns through collars which are represented by ovate shapes that surround regions of intersection of the beams and columns. Black ovate dots, which are presented on certain regions of the lines representing beams, along with single-line dark arrows, suggest, in the case of the black dots, former non-vertical, angular positions for the upper regions of the adjacent columns, with the arrows indicating directions of adjustments that occur as various ones of the different beams are lowered into positions between the columns. This arrangement of black dots and dark arrows in FIG. 8 clearly illustrates a very typical situation where, until a layer, so-to-speak, of beams is set into place (by gravity) at a particular elevation in a frame structure, the columns may have different conditions and angles of nonverticality.

Still looking at FIG. 8, the black dot and the dark arrow which appear at the extreme left side of this figure, along with an open, small, ovate dot and an open stubby arrow somewhat below and to the right of the left side of FIG. 8, generally picture the situation which was described with reference to FIG. 7 above.

Turning attention now to FIGS. 9 and 10, and beginning with FIG. 9, here there is shown a column 120 having an elongate axis 120a coupled through a collar 122 to four beams, only three of which are shown in FIG. 9—these being illustrated at 124, 126, 128. Digressing for just a moment to FIG. 10 which shows the same beam and column arrangement, here, the fourth beam 130 can be seen.

In FIG. 9, beams 124, 128 are shown loaded with moments, such being represented by arrows 132, 134, respectively. Focusing on just one of these moments, and specifically, moment 132, this moment is coupled by bearing-face compression through the inner and outer components of collar 122, as indicated by arrow 136. It is thus through compression that the moment load experienced (as illustrated in FIG. 9) by beam 124 is communicated, at least partially, by collar 122 to column 120. Continuing because of the unique construction of collar 122 in accordance with the invention, and because of the presence of tension-transmitting nut and bolt assemblies in collar 122, the outer collar structure within collar 122 also delivers compression through bearing faces that are present on the right side of collar 122 in FIG. 9. Such compression delivery is illustrated by arrow 138 in FIG. 9.

It is thus the case that moment 132 is delivered through bearing-face compression to angularly spaced locations that are distributed around (at different angular locations relative to) the long axis 120a of column 120. As a consequence, major load handling capability of column 120 is called upon and used immediately to deal with moment 132.

Moment 134 which has the direction indicated in FIG. 9 creates a similar kind of reaction in the manner of being delivered by way of compression through bearing faces distributed at angularly-spaced locations around the axis of column 120.

It should thus be seen how, because of the unique structure of the invention-proposed interconnections which exist in the relationship between a beam and a column according to the invention, moment loads are offered substantially the full-load handling resources of columns. And because of the fact that an overall frame structure which is constructed in accordance with the present invention is made up of an interconnected network of interconnect nodes, constructed and operating as described herein, essentially every lateral load delivered into such a building frame structure is distributed completely throughout the structure, and handled quite uniformly throughout, and by all of, the involved and associated columns.

FIG. 10 illustrates how lateral loads may come into existence in the beams so as to create, in a particular plane of beams, horizontal moment loads such as those illustrated by arrows 140, 142, 144, 146. If such moment loads come into existence, each one of them is effectively delivered as bearing-face compression through collar structure to plural, angularly distributed sides of columns, such as column 120. Such plural-location compression delivery of moment loads 140, 142, 144, 146 is represented by arrows 148, 150, 152, 154.

Because of the manner just generally described in which the structure of the present invention performs to handle moment loads in beams, a frame constructed according to the invention can be employed as pictured in FIG. 1—i.e., on top of a podium structure, with respect to which columns in the super structure do not align axially with the columns in the podium structure. An important reason for this advantage is that the structure of the present invention distributes loads in such a fashion that all columns in the row and column array of columns, interconnected through collar form nodes constructed according to the invention, share relatively equally in bearing lateral loads delivered to the superstructure frame.

Specifically all of the columns share loads in such a fashion that they can be employed without requiring that they be aligned with underlying structure columns, at least up to certain superstructure building dimensions which are larger than any which would be typically permitted today under currently applicable building codes.

Another important feature of the invention which has already been suggested earlier is that the components of the collar structures lend themselves to precise pre-manufacture in a factory-like setting, and even under automated control, all with the result that a building frame can be constructed with a high degree of on the job simplicity and accuracy. Not only that, but the particular configurations proposed for interconnecting beams and columns cause a frame, during assembly, and just under the influence of gravity, to set-lock in a stabilized, full-moment load-carrying conditions, even before tension-carrying bolt assemblies, or any other attachments, are introduced to the frame.

A further obvious advantage of the invention is that the components proposed by it are extremely simple in construction can be manufactured economically. Assembly of a building frame can be very quick.

The existence, according to the invention, of nodal interconnections which have the floating and discontinuous natures mentioned earlier herein results in a frame structure wherein, after a severe lateral load event, essentially "resettles" to its pre-load condition.

Figure 11:
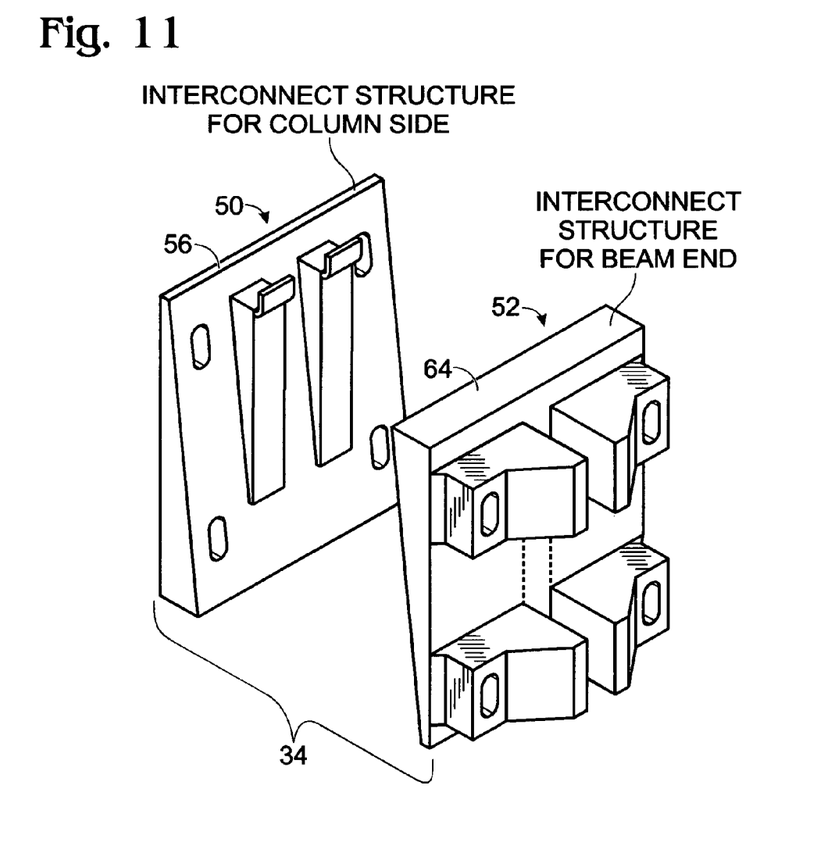
FIG. 11 shows a pair of facing but not yet interconnected interconnect components.
Figure 12:
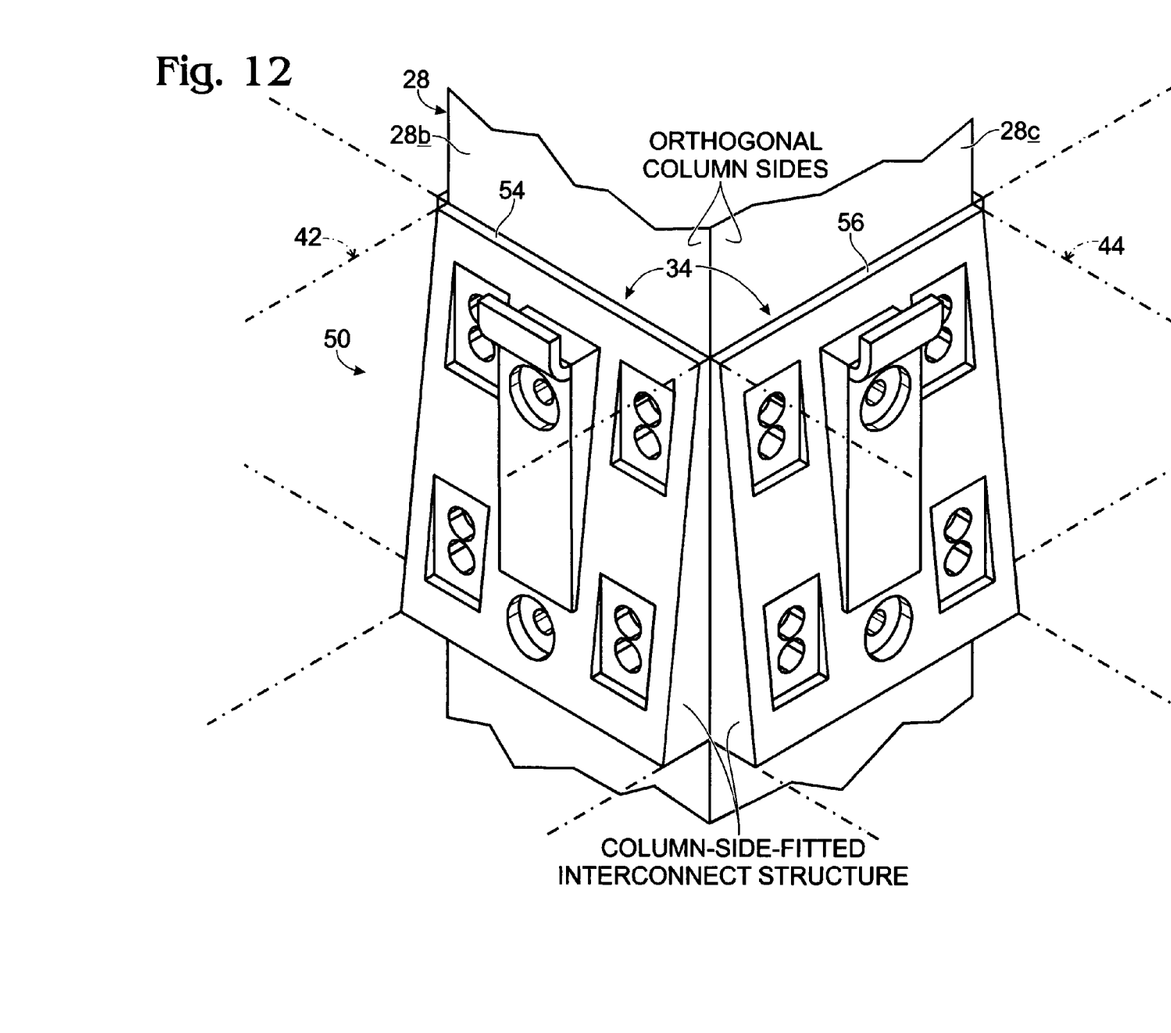
FIG. 12 illustrates a pair of column-side-connected interconnect components attached to two orthogonally related sides in a column.
Figure 13:
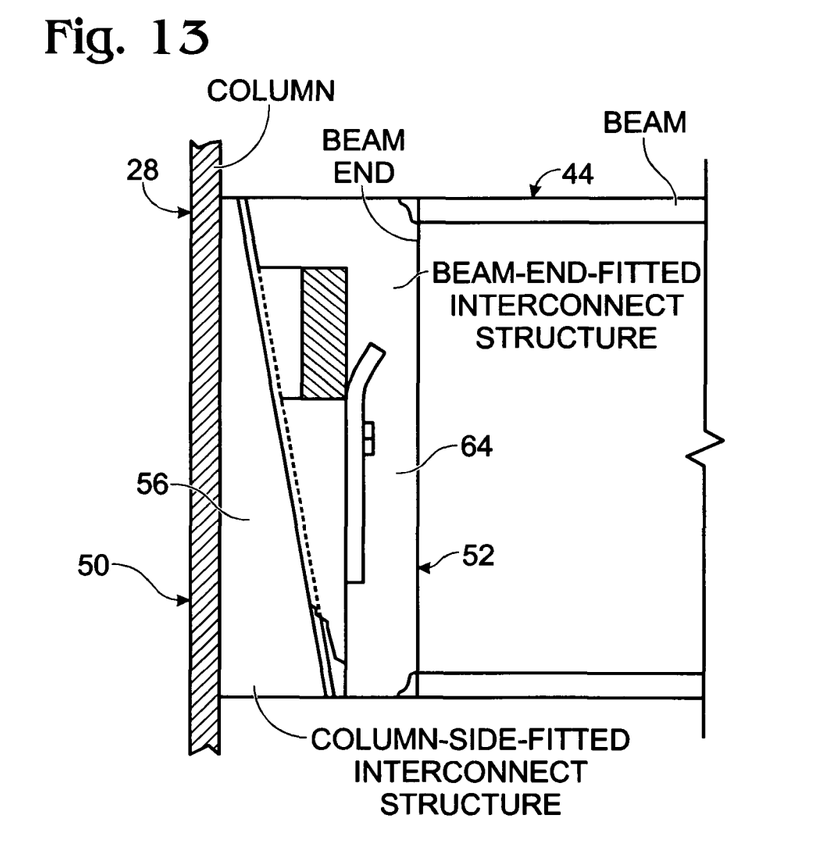
FIG. 13 illustrates a full-moment, gravity-quick-set interconnection between a column-side-connected interconnect component (pictured on the left side of the figure), and a beam-end-connected interconnect component (pictured on the right side of the figure). The specific interconnect structures shown in FIGS. 11-13, inclusive, are not per se collar-form structures

The constructions and operations of the predecessor non-collar-form versions of the present invention, shown in FIGS. 11-13, inclusive, in all cases offer essentially the same important drop-and-set features of the preferred form of the invention. As was mentioned earlier herein in the descriptions of these figures in the drawings, the early, full-moment, gravity interconnect structures there pictured are shown in very simplified forms. Basic numeric labeling in these three figures utilizes certain main ones of the reference numerals employed in FIGS. 1-4, inclusive.

Accordingly, while a preferred embodiment of the invention, and a manner of practicing it, along with several predecessor embodiments as pictured in FIGS. 11-13, inclusive, have been shown and described herein, it is understood that variations and modifications may be made without departing from the spirit of the invention.

I claim:

1. A method for assembling a full-moment structural building frame from elongate columns having sides and elongate beams having ends, wherein connections in the frame between columns and beams are full-moment connections, said method comprising
    pre-fitting the sides of columns and the ends of beams with attached, complementary interconnect structures, including (a) column-side-fitted male cleats, and (b) beam-end-fitted female sockets, said sockets being complementarily fittable with, by reception of, said cleats, and
    by simply lowering a pre-fitted beam relative to a pre-fitted column, seating a column-side-fitted cleat in a gravity-locked condition complementarily received within a beam-end-fitted socket, and thereby automatically establishing, without using any additional structure, a full-moment load-bearing connection between the beam and column, whereby moment loads carried in the beam are transferred through the full-moment connection to the column.

\* \* \* \* \*